US011981125B2

(12) United States Patent
Kitagawa et al.

(10) Patent No.: US 11,981,125 B2
(45) Date of Patent: May 14, 2024

(54) ROLL SUPPORTING DEVICE

(71) Applicant: FUJITSU FRONTECH LIMITED, Tokyo (JP)

(72) Inventors: Takeshi Kitagawa, Inagi (JP); Tsuyoshi Yamazaki, Inagi (JP); Hirokatsu Nakamura, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 432 days.

(21) Appl. No.: 17/326,545

(22) Filed: May 21, 2021

(65) Prior Publication Data

US 2021/0268814 A1 Sep. 2, 2021

Related U.S. Application Data

(63) Continuation of application No. PCT/JP2018/047093, filed on Dec. 20, 2018.

(51) Int. Cl.
*B65H 16/08* (2006.01)
*B41J 15/04* (2006.01)

(52) U.S. Cl.
CPC ............ *B41J 15/042* (2013.01); *B65H 16/08* (2013.01)

(58) Field of Classification Search
CPC ....... B41J 15/042; B65H 16/08; B65H 16/028
See application file for complete search history.

(56) References Cited

U.S. PATENT DOCUMENTS

| | | | | |
|---|---|---|---|---|
| 9,187,281 | B2 * | 11/2015 | Chang | B65H 26/06 |
| 2005/0002721 | A1 | 1/2005 | Koyabu | |
| 2009/0028623 | A1 * | 1/2009 | Yokoyama | B41J 3/4075 400/613 |

(Continued)

FOREIGN PATENT DOCUMENTS

| | | |
|---|---|---|
| JP | 59-12036 | 1/1984 |
| JP | 59-91243 | 6/1984 |

(Continued)

OTHER PUBLICATIONS

Office Action, dated Jun. 16, 2022, in corresponding Chinese Patent Application No. 201880100207.2 (17 pp.).

(Continued)

*Primary Examiner* — Sang K Kim
(74) *Attorney, Agent, or Firm* — STAAS & HALSEY LLP

(57) ABSTRACT

A roll supporting device includes: a pair of supporting rollers which support an outer circumferential surface of a rolled medium, and which are provided so as to rotate together with the rolled medium; a side wall which has a reference surface coming into contact with one end surface of the rolled medium in an axial direction along a central axis of the rolled medium; and a pair of restricting members which press another end surface of the rolled medium toward the reference surface. The pair of supporting rollers are disposed on both sides of the central axis of the rolled medium when viewed in the axial direction of the rolled medium. The pair of restricting members are disposed outside a space between the pair of supporting rollers in a circumferential direction of the rolled medium, and are respectively adjacent to the supporting rollers, and are provided so as to be movable independently from each other.

5 Claims, 8 Drawing Sheets

(56) References Cited

U.S. PATENT DOCUMENTS

| | | | | |
|---|---|---|---|---|
| 2014/0147186 | A1* | 5/2014 | Uchino | B41J 3/4075<br>400/613 |
| 2014/0147187 | A1* | 5/2014 | Jo | B41J 29/13<br>400/613 |
| 2014/0225972 | A1* | 8/2014 | Kanda | B41J 15/042<br>347/215 |
| 2015/0069171 | A1* | 3/2015 | Chang | B65H 26/06<br>242/563 |
| 2017/0348989 | A1* | 12/2017 | Sanada | B41J 11/0095 |

FOREIGN PATENT DOCUMENTS

| | | |
|---|---|---|
| JP | 8-217294 | 8/1996 |
| JP | 10-72147 | 3/1998 |
| JP | 2005-1381 | 1/2005 |
| JP | 2017-218285 | 12/2017 |

OTHER PUBLICATIONS

International Search Report, dated Mar. 26, 2019, in International Application No. PCT/JP2018/047093 (5 pp.).

Written Opinion of the International Searching Authority, dated Mar. 26, 2019, in International Application No. PCT/JP2018/047093 (4 pp.).

* cited by examiner

ROLL SUPPORTING DEVICE

CROSS-REFERENCE TO RELATED APPLICATION

This application is a continuation application of International Application PCT/JP2018/047093, filed on Dec. 20, 2018 and designating the U.S., the entire contents of which are incorporated herein by reference.

FIELD

The present invention relates to a roll supporting device.

BACKGROUND

A roll supporting device is known that supports a rolled medium serving as a long medium wrapped into a roll, such as rolled paper. The roll supporting device is used to supply long paper pulled out from rolled paper to a printing device. This type of roll supporting device has a center supporting structure that supports the center of rolled paper or an outer circumference supporting structure that supports the outer circumference of rolled paper.

Patent Literature 1: Japanese Patent Application Laid-open No. S59-12036

FIG. 10 is a plan view for describing a roll supporting device in the related art. FIG. 11 is a side view for describing the roll supporting device in the related art. As illustrated in FIG. 10 and FIG. 11, the roll supporting device 105 having the outer circumference supporting structure, includes a plurality of supporting rollers 111 that support the outer circumferential surface of rolled paper 103, and side walls 112 and 113 that are disposed on both sides in a direction along the central axis O of the rolled paper 103, that is, the width direction of the rolled paper 103. With this roll supporting device 105, rotation of the entire rolled paper 103 rotates the supporting rollers 111, and long paper 103*a* is pulled out from the rolled paper 103.

The aforementioned roll supporting device 105 has play between both sides in the direction along the central axis O of the rolled paper 103, that is, the width direction of the rolled paper 103 and the side walls 112 and 113 to enable smooth rotation of the rolled paper 103, and the rolled paper 103 is supported movably by this play in the width direction. Thus, with the roll supporting device 105, when the long paper 103*a* is pulled out from the rolled paper 103, the entire rolled paper 103 tends to sway and deviate in the width direction of the long paper 103*a* as illustrated in FIG. 10.

Sway of the entire rolled paper 103 or the like may cause the long paper 103*a* wrapped into a roll to protrude from an end surface of the rolled paper 103, forming a bamboo shoot shape, which may stop rotation of the rolled paper 103. In addition, deviation of the long paper 103*a* may cause the long paper 103*a* wrapped into a roll to slacken as illustrated in FIG. 11, and the slack long paper 103*a* may be squeezed between the supporting rollers 111 and the outer circumference of the rolled paper 103, which may prevent the rolled paper 103 from rotating smoothly. As a result, supply of the long paper 103*a* from the rolled paper 103 may be stopped, which decreases reliability of operation of pulling out the long paper 103*a* from the rolled paper 103.

Moreover, the long paper 103*a* of the rolled paper 103 is wrapped in an outside wrapping type, in which the printing surface is on the outer circumferential side of the long paper 103*a* wrapped into a roll, or in an inside wrapping type, in which the printing surface is on the inner circumferential side of the long paper 103*a* wrapped into a roll. When the rolled paper 103 used is of the outside wrapping type, the long paper 103*a* is pulled out from the outer circumference at an upper portion of the rolled paper 103. On the other hand, when the rolled paper 103 used is of the inside wrapping type, the long paper 103*a* is pulled out from the outer circumference at a lower portion of the rolled paper 103, and the rolled paper 103 rotates in a direction opposite to the rotating direction of the rolled paper 103 of the outside wrapping type to pull out the long paper 103*a*. In this way, the entire rolled paper 103 sways differently depending on the difference in the rotating direction of the rolled paper 103 in pulling out the long paper 103*a* from the rolled paper 103, and it is difficult to stably pull out the long paper 103*a* from the rolled paper 103.

SUMMARY

According to an aspect of the embodiments, a roll supporting device includes: a pair of supporting rollers, which support an outer circumferential surface of a rolled medium that includes a wrapped long medium, and which are provided so as to rotate together with the rolled medium; a side wall which includes a reference surface that comes into contact with one end surface of the rolled medium in an axial direction along a central axis of the rolled medium; and a pair of restricting members which press another end surface of the rolled medium in the axial direction toward the reference surface, wherein the pair of supporting rollers are disposed on both sides of the central axis of the rolled medium when viewed in the axial direction of the rolled medium, and the pair of restricting members are disposed outside a space between the pair of supporting rollers in a circumferential direction of the rolled medium, and are respectively adjacent to the pair of supporting rollers, and are provided so as to be movable independently from each other.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of a roll supporting device disclosed in this application, will be described in detail below with reference to the drawings. Note that the roll supporting device disclosed in this application, is not limited to the following embodiments.

Embodiments (Configuration of Printer)

Figure 1:
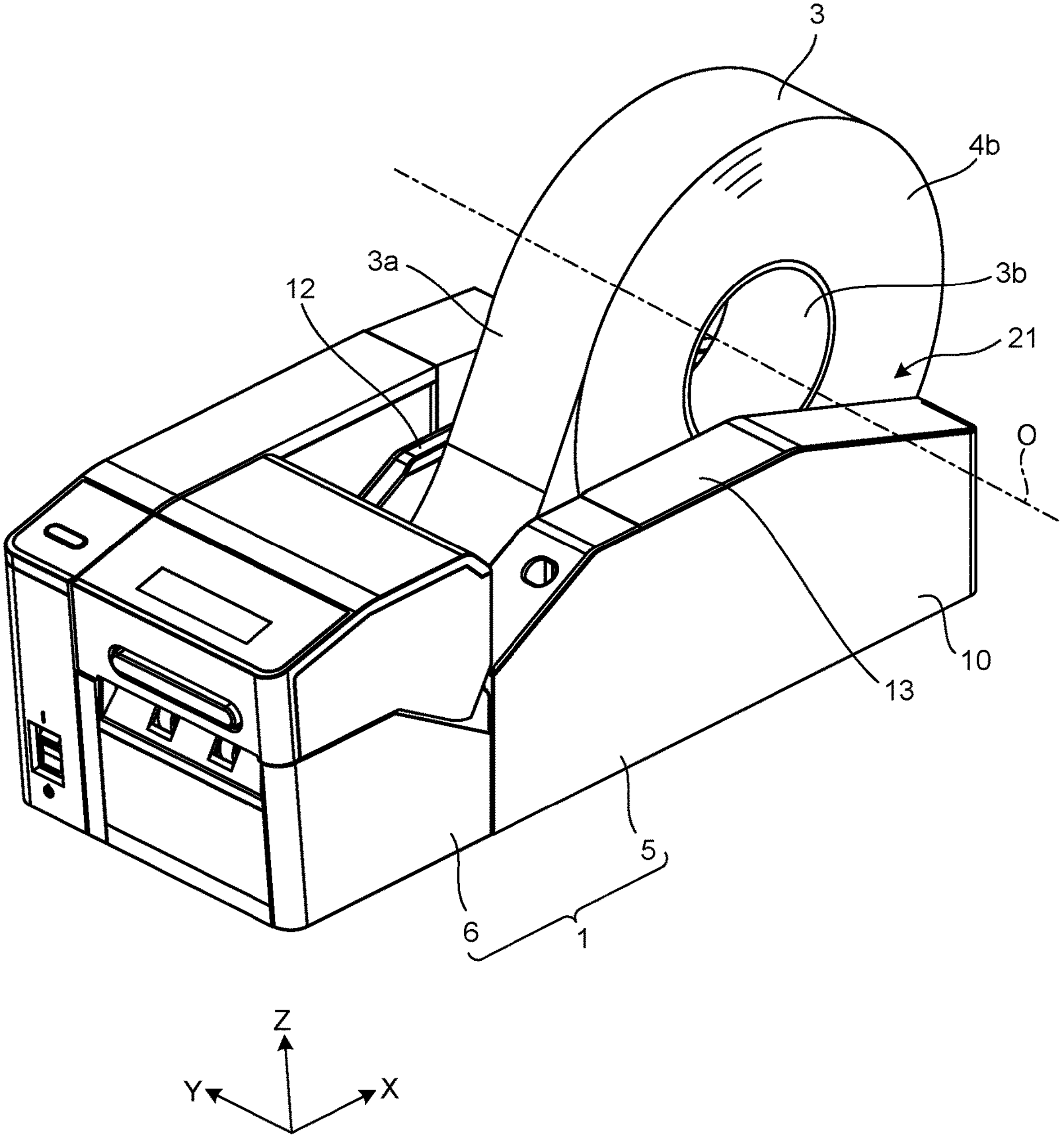
FIG. 1 is a perspective view illustrating a printer that includes a roll supporting device according to an embodiment.
Figure 2:
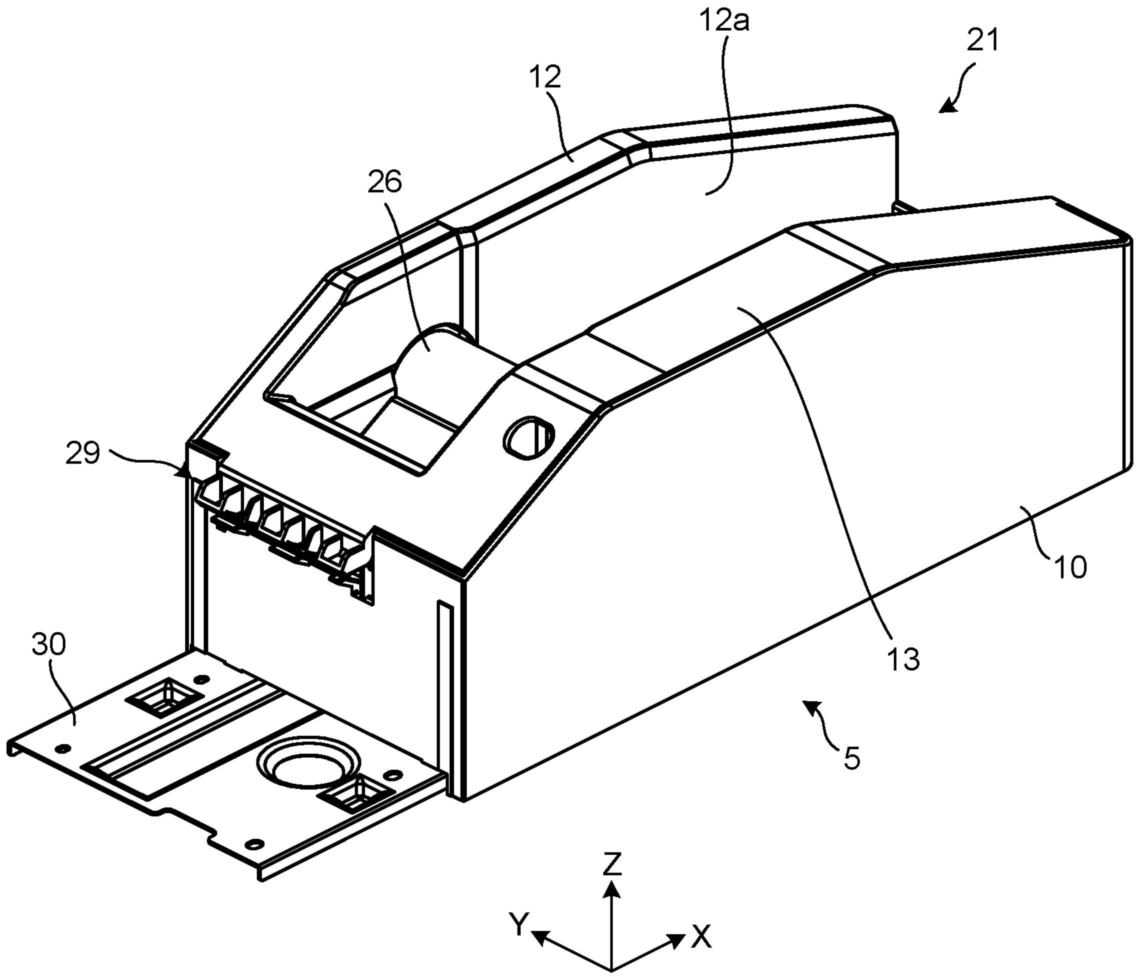
FIG. 2 is a perspective view illustrating the roll supporting device according to the embodiment.

FIG. 1 is a perspective view illustrating a printer 1 that includes a roll supporting device 5 according to an embodiment. FIG. 2 is a perspective view illustrating the roll supporting device 5 according to the embodiment. As illustrated in FIG. 1 and FIG. 2, the printer 1 includes the roll supporting device 5, which supports rolled paper 3 serving as a rolled medium, and a printing device 6, which prints on long paper 3*a* supplied from the rolled paper 3 on the roll supporting device 5. The printing device 6 includes a print head, which prints on the long paper 3*a* supplied from the rolled paper 3, and which is not illustrated. For example, a thermal head is used as the print head.

In FIG. 1, an X direction indicates the depth direction of the printer 1, a Y direction indicates the width direction of the printer 1, and a Z direction indicates the height direction of the printer 1. Similar to FIG. 1, in FIG. 2 and the subsequent drawings, X, Y, and Z directions indicate the directions of the roll supporting device 5. The axial direction along the central axis O of the rolled paper 3 supported by the roll supporting device 5, that is, the width direction of the rolled paper 3 coincides with the width direction (Y direction) of the printer 1. The long paper 3*a* is pulled out from the rolled paper 3 supported by the roll supporting device 5 in the X direction of the printer 1. The rolled paper 3 is formed by wrapping, around a core 3*b*, the long paper 3*a* having a small dimension in the width direction of the rolled paper 3 (Y direction) and having a so-called tape shape. The present embodiment uses rolled paper 3 that has an outer diameter of approximately 200 [mm] or less, and that includes a core 3*b* having an outer diameter of approximately 80 [mm].

Note that the present embodiment uses the rolled paper 3, which is the long paper 3*a* wrapped around the core 3*b*, as a rolled medium; however, the rolled medium is not limited to the rolled paper 3. For example, label paper, in which labels are placed on released paper, or rolled paper, in which radio frequency identifier (RFID) tags are embedded, may be used as the rolled medium. Furthermore, the rolled medium is not limited to having a core, around which a medium is wrapped, and a rolled medium having no core, may be used.

(Configuration of Roll Supporting Device)

Figure 3:
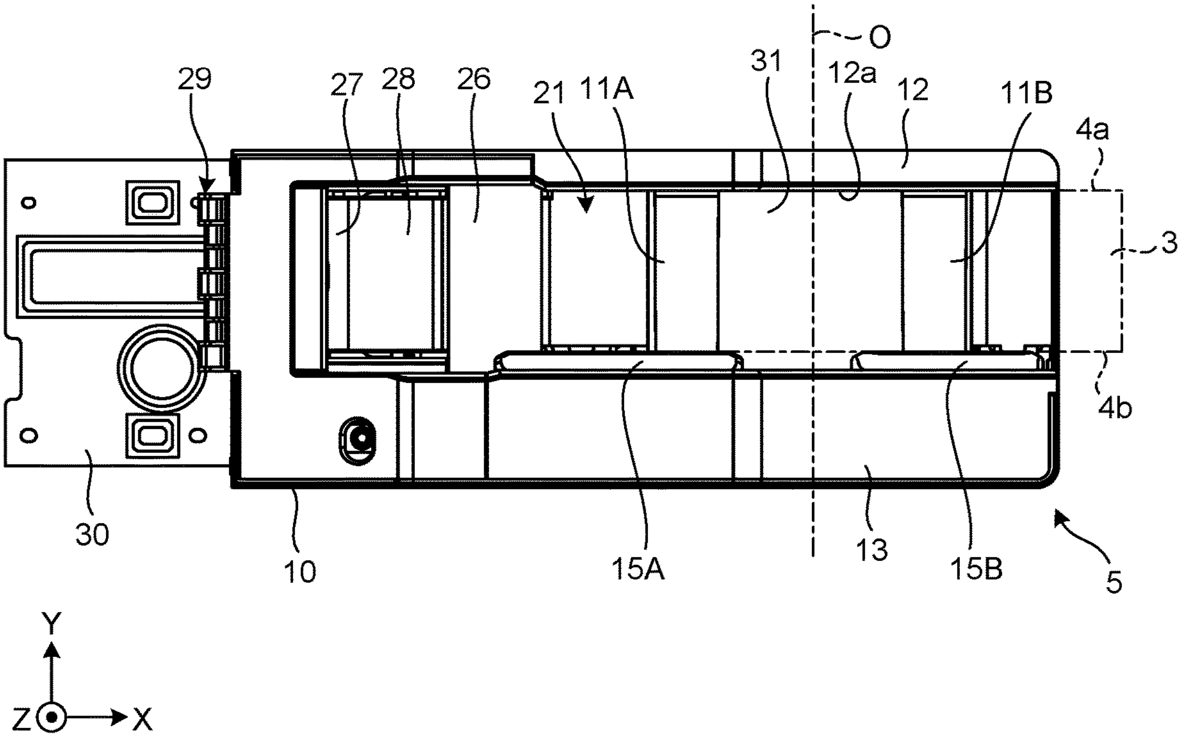
FIG. 3 is a plan view illustrating the roll supporting device according to the embodiment.
Figure 4:
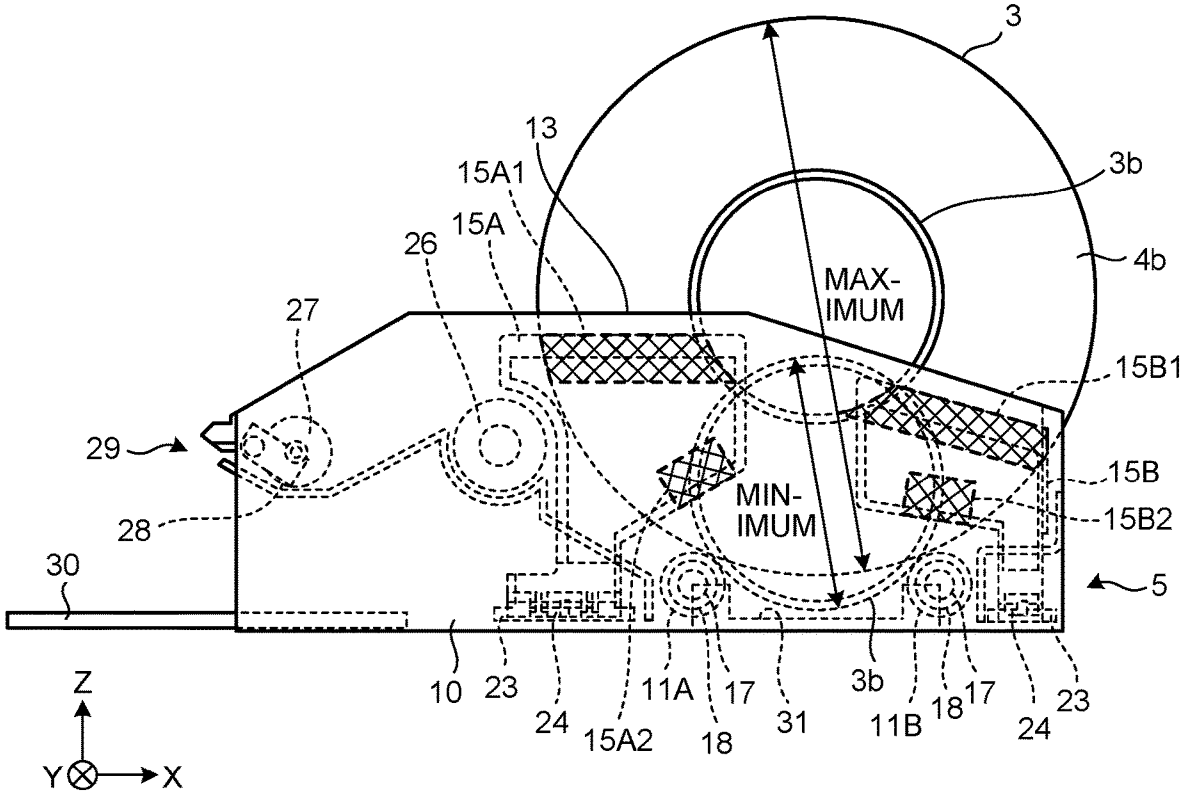
FIG. 4 is a side view illustrating the roll supporting device according to the embodiment.

FIG. 3 is a plan view illustrating the roll supporting device 5 according to the embodiment. FIG. 4 is a side view illustrating the roll supporting device 5 according to the embodiment. As illustrated in FIG. 2, FIG. 3, and FIG. 4, the roll supporting device 5 includes a base 10, which supports the rolled paper 3, and a pair of supporting rollers 11A and 11B, which support an outer circumferential surface of the rolled paper 3 including the wrapped long paper 3*a*.

The roll supporting device 5 further includes a side wall 12, which includes a reference surface 12*a* that comes into contact with one end surface 4*a* of the rolled paper 3 in the axial direction along the central axis O of the rolled paper 3 (Y direction), a side wall 13, which is disposed facing the side wall 12, and a pair of restricting members 15A and 15B, which press another end surface 4*b* of the rolled paper 3 in the width direction of the rolled paper 3 (Y direction) toward the reference surface 12*a*.

The pair of supporting rollers 11A and 11B are disposed on the base 10 at a predetermined interval therebetween in a direction of pulling out the long paper 3*a* from the rolled paper 3 (X direction), and are provided rotatably about axes parallel to the central axis O of the rolled paper 3. Thus, the supporting rollers 11A and 11B are provided so as to rotate together with the rolled paper 3 that rotates by pulling out the long paper 3*a*. The pair of supporting rollers 11A and 11B are disposed on both sides of the central axis O of the rolled paper 3 when viewed in the axial direction of the rolled paper 3 (Y direction). In other words, the pair of supporting rollers 11A and 11B are disposed on both sides across the core 3*b* of the rolled paper 3 in the direction of pulling out the long paper 3*a* from the rolled paper 3 (X direction).

Figure 5:
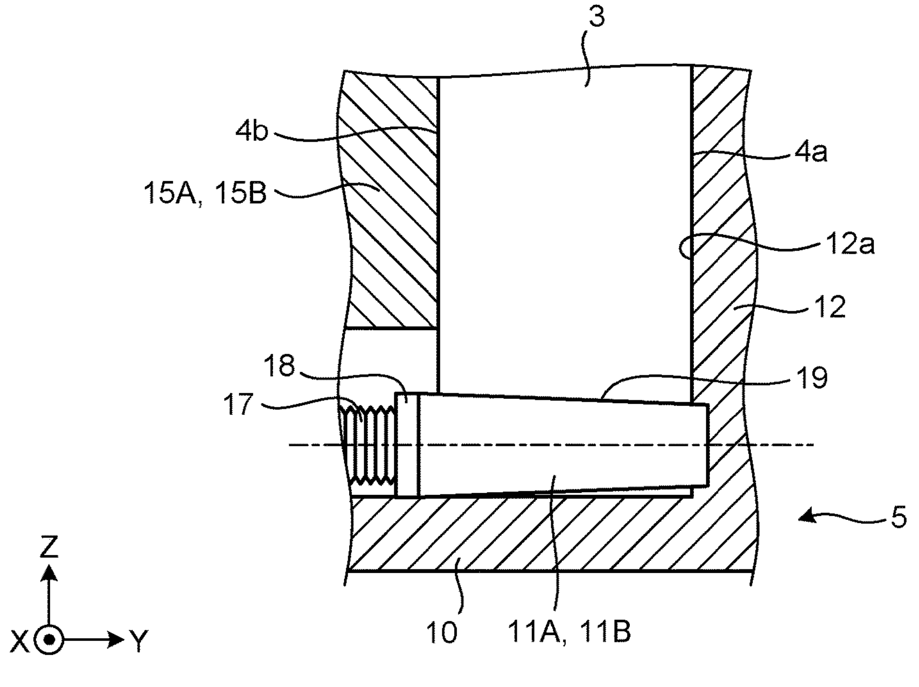
FIG. 5 is a sectional view for describing supporting rollers of the roll supporting device according to the embodiment.

FIG. 5 is a sectional view for describing the supporting rollers 11A and 11B of the roll supporting device 5 according to the embodiment. As illustrated in FIG. 4 and FIG. 5, a compression spring 17 serving as a load applying member, which applies a rotational load to each of the supporting rollers 11A and 11B, is disposed on one end of each of the paired supporting rollers 11A and 11B in the axial direction (Y direction), and the compression spring 17 applies pressing force in the axial direction of each of the supporting rollers 11A and 11B. A spring bearing member 18, against which one end of the compression spring 17 abuts, is disposed on the one end of each of the supporting rollers 11A and 11B, and the other end of the compression spring 17 abuts against the side wall 13. The pressing force from the compression spring 17 presses the other end of each of the supporting rollers 11A and 11B against the side wall 12, and slide resistance thus generated on the rotating supporting rollers 11A and 11B, generates the rotational load.

The pair of supporting rollers 11A and 11B have the rotational load applied thereto by the compression springs 17, so that when the rolled paper 3 rotates through inertia by pulling out the long paper 3*a* from the rolled paper 3, rotation of the supporting rollers 11A and 11B is reduced. This reduces inertial rotation of the rolled paper 3, and the wrapped long paper 3*a* of the rolled paper 3 is thus prevented from loosening. Note that an electromagnetic brake, which is not illustrated, may be used instead of the compression springs 17.

Furthermore, as illustrated in FIG. 5, the pair of supporting rollers 11A and 11B each include a tapered surface 19 that has an outer diameter decreasing in the width direction of the rolled paper 3 (Y direction), that is, from the end surface 4*b* side of the rolled paper 3 to the end surface 4*a* side. The rolled paper 3 supported by the tapered surfaces 19, is moved toward the reference surface 12*a*, and the end surface 4*a* of the rolled paper 3 smoothly comes into contact with the reference surface 12*a*, which enhances stability of a restricted state in the width direction of the rolled paper 3 (Y direction).

Note that the number of the supporting rollers 11A and 11B is not limited to one pair of supporting rollers 11A and 11B, and, for example, another supporting roller may be disposed in the vicinity of the pair of supporting rollers 11A and 11B in the circumferential direction of the rolled paper 3. Moreover, the supporting rollers 11A and 11B are each provided so as to support the rolled paper 3 over the width direction of the rolled paper 3 (Y direction); however, a plurality of supporting rollers that can rotate independently, may be aligned in the width direction of the rolled paper 3 (Y direction).

As illustrated in FIG. 3 and FIG. 5, the reference surface 12*a* parallel to the vertical direction, is defined on a surface, facing the side wall 13, of the side wall 12. The reference surface 12*a* is a flat surface parallel to the X-Z plane. The side wall 13 is formed such that a placing space 21 where the rolled paper 3 is placed on the base 10 is defined between the side wall 13 and the reference surface 12*a* of the side wall 12. The pair of supporting rollers 11A and 11B are disposed in the placing space 21. The pair of restricting members 15A and 15B are disposed on a surface, facing the reference surface 12*a*, of the side wall 13.

As illustrated in FIG. 3 and FIG. 4, the pair of restricting members 15A and 15B are disposed outside a space between the pair of supporting rollers 11A and 11B in the circumferential direction of the rolled paper 3, and are respectively adjacent to the supporting rollers 11A and 11B, and are provided so as to be movable independently from each other. The pair of restricting members 15A and 15B are shaped into plates, and a shaft part 23 swingably supported by the side wall 13 of the base 10 is formed on a lower end of each of the restricting members 15A and 15B. The shaft part 23 of each of the restricting members 15A and 15B, is provided with a torsion coil spring 24, which urges each of the restricting members 15A and 15B toward the reference surface 12*a*.

Thus, each of the restricting members 15A and 15B is provided so as to be movable via the shaft part 23 in the width direction of the rolled paper 3 placed in the placing space 21 (Y direction), and is urged by the torsion coil spring 24 in a direction of pressing the end surface 4*b* of the rolled paper 3. This enables the reference surface 12*a* and the pair of restricting members 15A and 15B to restrict the end surfaces 4*a* and 4*b* of the rolled paper 3, which is placed in the placing space 21 in the width direction of the long paper 3*a* (Y direction). This reduces sway of the entire rolled paper 3 and slack of the wrapped long paper 3*a* of the rolled paper 3 in pulling out the long paper 3*a* from the rolled paper 3.

Furthermore, the pair of restricting members 15A and 15B are provided so as to be movable independently from each other, so that even if sway of the rolled paper 3 moves one of the restricting members 15A and 15B, the other of the restricting members 15A and 15B can maintain a restricted state of the end surface 4*b* of the rolled paper 3. This can properly restrict the rolled paper 3 in the width direction (Y direction).

Furthermore, as illustrated in FIG. 4, the restricting member 15A includes restricting areas 15A1 and 15A2, which come into contact with the end surface 4*b* over a portion extending from the outer circumference in the radial direction of the rolled paper 3 to the inner circumference of the core 3*b* during a period, in which the long paper 3*a* is pulled out from the rolled paper 3 from the beginning until the end. Similar to the restricting member 15A, the restricting member 15B includes restricting areas 15B1 and 15B2, which come into contact with the end surface 4*b* over a portion extending from the outer circumference in the radial direction of the rolled paper 3 to the inner circumference of the core 3*b* during the period, in which the long paper 3*a* is pulled out from the rolled paper 3 from the beginning until the end.

Furthermore, as illustrated in FIG. 3 and FIG. 4, the base 10 is provided with a first guide roller 26 and a second guide roller 27 that guide the long paper 3*a* pulled out from the rolled paper 3. The first guide roller 26 is disposed adjacent to a side, of the rolled paper 3 placed on the placing space 21, where the long paper 3*a* is pulled out (printing device 6 side). A transport path 28 for transporting the long paper 3*a*, which is pulled out from the rolled paper 3, from the first guide roller 26 to the second guide roller 27, is formed on the base 10. The base 10 is provided with a paper feeding port 29 that is connected to a transport path (not illustrated) of the printing device 6, and the second guide roller 27 is disposed in the vicinity of the paper feeding port 29.

The base 10 of the roll supporting device 5 is further provided with a connector 30 that is disposed below the paper feeding port 29, and that is connected to the printing device 6. Furthermore, a recessed portion 31, where the core 3*b* enters when the long paper 3*a* is pulled out from the rolled paper 3 until the end, is formed between the supporting roller 11A and the supporting roller 11B below the placing space 21 of the base 10.

(Effects of Restricting Members in Accordance with Variation in Outer Diameter of Rolled Paper)

Effects of the pair of restricting members 15A and 15B in the roll supporting device 5 that has the above configuration, will be described. As illustrated in FIG. 4, when the rolled paper 3 has its maximum outer diameter at the start of using the rolled paper 3, the restricting area 15A1, which is disposed at an upper portion of the restricting member 15A, comes into contact with a portion extending from the outer circumference of the end surface 4*b* of the rolled paper 3 to the inner circumference of the core 3*b*, thereby restricting movement of the rolled paper 3 in the width direction (Y direction). When the rolled paper 3 has its minimum outer diameter at the time of running out by pulling out the long paper 3*a* from the rolled paper 3 until the end, the restricting area 15A2, which is disposed at a lower portion of the restricting member 15A, comes into contact with a portion extending from the outer circumference of the end surface 4*b* of the rolled paper 3 to the inner circumference of the core 3*b*, thereby restricting movement of the rolled paper 3 in the width direction (Y direction).

Similar to the restricting member 15A, when the rolled paper 3 has its maximum outer diameter at the start of using the rolled paper 3, the restricting area 15B1, which is disposed at an upper portion of the restricting member 15B, comes into contact with a portion extending from the outer circumference of the end surface 4*b* of the rolled paper 3 to the inner circumference of the core 3*b*, thereby restricting movement of the rolled paper 3 in the width direction (Y direction). When the rolled paper 3 has its minimum outer diameter at the time of running out of the rolled paper 3, the restricting area 15B2, which is disposed at a lower portion of the restricting member 15B, comes into contact with a portion extending from the outer circumference of the end surface 4*b* of the rolled paper 3 to the inner circumference of the core 3*b*, thereby restricting movement of the rolled paper 3 in the width direction (Y direction).

Thus, each of the restricting members 15A and 15B comes into contact with the entire area in the radial direction of the rolled paper 3 descending as its outer diameter decreases during a period of use from the start of using the rolled paper 3 until when the long paper 3*a* runs out, irrespective of variation in the outer diameter of the rolled paper 3. This enables a shape that maintains the restricted state of the rolled paper 3 in the width direction (Y direction) during the period of use of the rolled paper 3.

(Effects of Restricting Members in Accordance with Difference in Rotating Direction of Rolled Paper)

Figure 6:
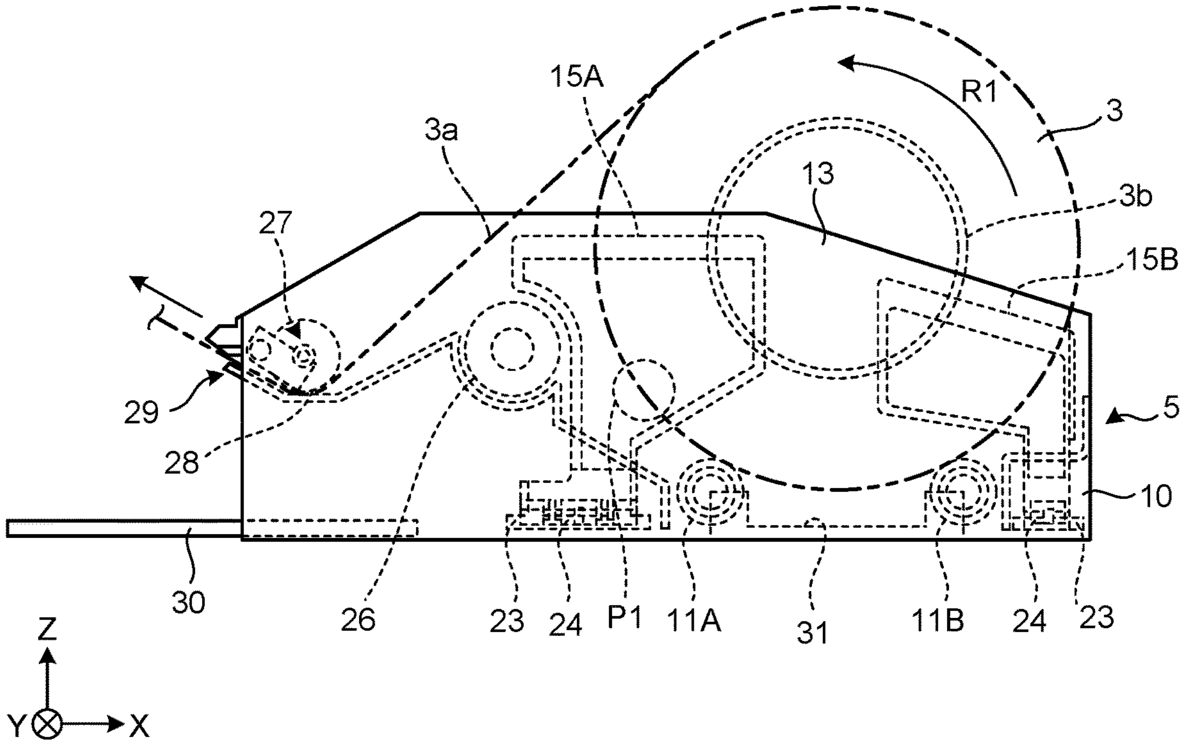
FIG. 6 is a side view illustrating a state in which long paper is pulled out from the upper side of the outer circumference of rolled paper in the roll supporting device according to the embodiment.
Figure 7:
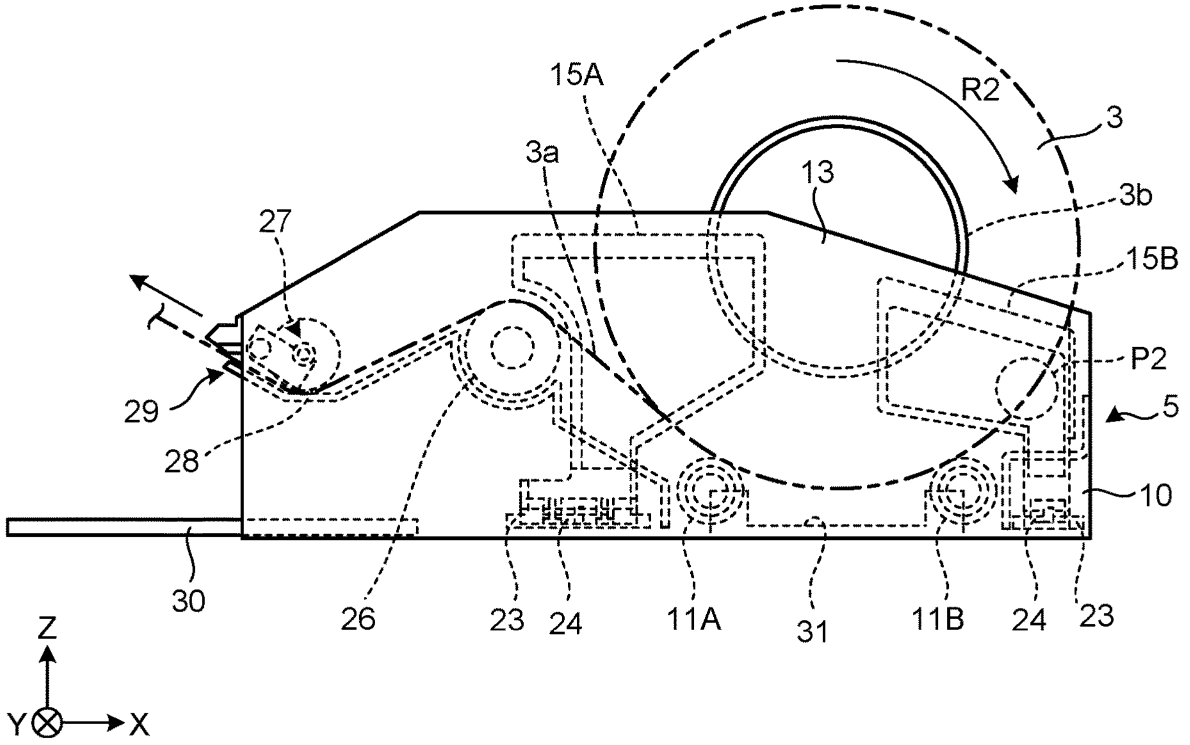
FIG. 7 is a side view illustrating a state in which the long paper is pulled out from the lower side of the outer circumference of the rolled paper in the roll supporting device according to the embodiment.

FIG. 6 is a side view illustrating a state in which the long paper 3*a* is pulled out from the upper side of the outer circumference of the rolled paper 3 in the roll supporting device 5 according to the embodiment. FIG. 7 is a side view illustrating a state in which the long paper 3*a* is pulled out from the lower side of the outer circumference of the rolled paper 3 in the roll supporting device 5 according to the embodiment.

When the rolled paper 3 used is of an outside wrapping type, in which the printing surface is on the outer circumferential side of the long paper 3*a* wrapped into a roll, as illustrated in FIG. 6, the long paper 3*a* is pulled out from the upper side of the outer circumference of the rolled paper 3, and thus the rolled paper 3, which is supported by the pair of supporting rollers 11A and 11B, rotates in an R1 direction in FIG. 6, that is, counterclockwise. When the rolled paper 3 rotates in the R1 direction, a greater external force is applied between an upper portion of the outer circumference of the rolled paper 3 and the supporting roller 11A, than between the upper portion of the outer circumference of the rolled paper 3 and the supporting roller 11B.

Figure 10:
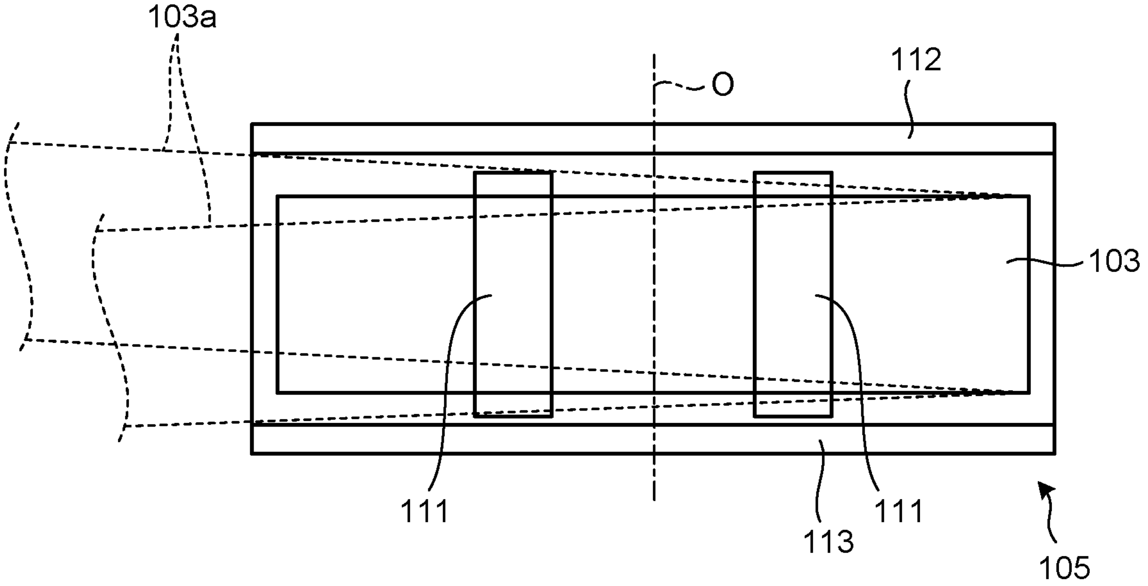
FIG. 10 is a plan view for describing a roll supporting device in the related art.
Figure 11:
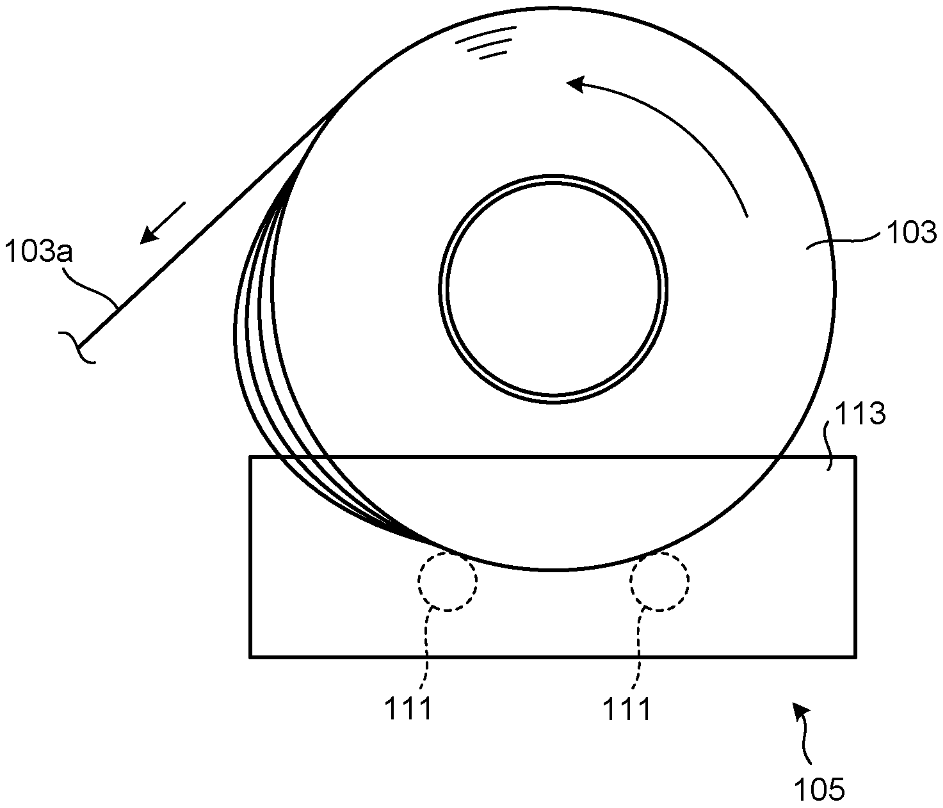
FIG. 11 is a side view for describing the roll supporting device in the related art.

This may cause the rolled paper 3 to be unsteady at and in the vicinity of a portion P1 upstream of the supporting roller 11A in the rotating direction of the rolled paper 3 (R1 direction), and the outer circumference of the rolled paper 3 may float up and be separated from the supporting roller 11A. This may cause the long paper 3*a* wrapped into a roll to slacken at the portion P1 (see FIG. 10), and the slack long paper 3*a* may be squeezed between the supporting roller 11A, which is located in the vicinity of the downstream side in the rotating direction of the rolled paper 3 (R1 direction), and the entire rolled paper 3. This may result in deformation or jamming of the long paper 3*a*, and may prevent the rolled paper 3 from rotating in the R1 direction or may stop rotation of the rolled paper 3.

In the present embodiment, even if the aforementioned behavior causes the rolled paper 3 to sway, the restricting member 15A, which is disposed adjacent to and upstream of the supporting roller 11A in the rotating direction of the rolled paper 3 (R1 direction), restricts the end surface 4*b* of the rolled paper 3 at the portion P1, thereby restricting movement of the rolled paper 3 in the width direction of the rolled paper 3 (Y direction) between the restricting member 15A and the reference surface 12*a*. In this way, the rolled paper 3 is restricted by the restricting member 15A and the reference surface 12*a* in the vicinity of the upstream side of the supporting roller 11A in the rotating direction (R1 direction), and unsteadiness (sway) of the rolled paper 3 is thus reduced, stabilizing the orientation of the rolled paper 3 and reducing slack of the long paper 3*a* wrapped into a roll at the portion P1. This enhances stability of rotating operation of the rolled paper 3 in the R1 direction. Furthermore, when the rolled paper 3 rotates in the R1 direction, the rolled paper 3 is pressed against the reference surface 12*a* on the supporting roller 11A side in the X direction (a portion, in the vicinity of the supporting roller 11A, of the reference surface 12*a*) because the tapered surface 19 of the supporting roller 11A has a greater outer diameter on the end surface 4*b* side and the peripheral speed is higher by the difference. As a result, the supporting roller 11A, which includes the tapered surface 19, serves to assist the restriction by the restricting member 15A, thereby further enhancing stability of rotating operation of the rolled paper 3 in the R1 direction.

When the rolled paper 3 used is of an inside wrapping type, in which the printing surface is on the inner circumferential side of the long paper 103*a* wrapped into a roll, as illustrated in FIG. 7, the long paper 3*a* is pulled out from the lower side of the outer circumference of the rolled paper 3, and thus the rolled paper 3, which is supported by the pair of supporting rollers 11A and 11B, rotates in an R2 direction in FIG. 7, that is, clockwise. When the rolled paper 3 rotates in the R2 direction, a greater external force is applied between the upper portion of the outer circumference of the rolled paper 3 and the supporting roller 11B, than between the upper portion of the outer circumference of the rolled paper 3 and the supporting roller 11A.

This may cause the rolled paper 3 to be unsteady at and in the vicinity of a portion P2 upstream of the supporting roller 11B in the rotating direction of the rolled paper 3 (R2 direction), and the outer circumference of the rolled paper 3 may float up and be separated from the supporting roller 11B. This may cause the long paper 3*a* wrapped into a roll to slacken at the portion P2, and the slack long paper 3*a* may be squeezed between the supporting roller 11B, which is located in the vicinity of the downstream side in the rotating direction of the rolled paper 3 (R2 direction), and the entire rolled paper 3. This may result in deformation or jamming of the long paper 3*a*, and may prevent the rolled paper 3 from rotating in the R2 direction, or may stop rotation of the rolled paper 3.

In the present embodiment, even if the aforementioned behavior causes the rolled paper 3 to sway, the restricting member 15B, which is disposed adjacent to and upstream of the supporting roller 11B in the rotating direction of the rolled paper 3 (R2 direction), restricts the end surface 4*b* of the rolled paper 3 at the portion P2. Thus, movement of the rolled paper 3 in the width direction of the rolled paper 3 (Y direction), is restricted between the restricting member 15B and the reference surface 12*a*. In this way, the rolled paper 3 is restricted by the restricting member 15B and the reference surface 12*a* in the vicinity of the upstream side of the supporting roller 11B in the rotating direction (R2 direction), and unsteadiness (sway) of the rolled paper 3 is thus reduced, stabilizing the orientation of the rolled paper 3 and reducing slack of the long paper 3*a* wrapped into a roll at the portion P2. This enhances stability of rotating operation of the rolled paper 3 in the R2 direction. Furthermore, when the rolled paper 3 rotates in the R2 direction, the rolled paper 3 is pressed against the reference surface 12*a* on the supporting roller 11B side in the X direction (a portion, in the vicinity of the supporting roller 11B, of the reference surface 12*a*) because the tapered surface 19 of the supporting roller 11B has a greater outer diameter on the end surface 4*b* side and the peripheral speed of the supporting roller 11B is higher by the difference. As a result, the supporting roller 11B, which includes the tapered surface 19, serves to assist the restriction by the restricting member 15B, thereby further enhancing stability of rotating operation of the rolled paper 3 in the R2 direction.

Thus, irrespective of difference in the rotating direction of the rolled paper 3 and difference in the behavior of the rotating rolled paper 3, the restricting member 15A (15B), which is located upstream in the rotating direction (R1 or R2 direction) of the rolled paper 3 among the pair of restricting members 15A and 15B, effectively reduces unsteadiness of the rolled paper 3, resulting in more reliable operation of pulling out the long paper 3*a* from the rolled paper 3.

(Advantageous Effects of Embodiment)

As described above, the roll supporting device 5 of the embodiment includes the pair of supporting rollers 11A and 11B, which support the outer circumferential surface of the rolled paper 3, the side wall 12, which includes the reference surface 12*a* that comes into contact with the end surface 4*a* of the rolled paper 3, and the pair of restricting members 15A and 15B, which press the end surface 4*b* of the rolled paper 3 toward the reference surface 12*a*. The pair of restricting members 15A and 15B are disposed outside the space between the pair of supporting rollers 11A and 11B in the circumferential direction of the rolled paper 3, and are respectively adjacent to the supporting rollers 11A and 11B, and are provided so as to be movable independently from each other. This reduces sway of the entire rolled paper 3 and deviation of the long paper 3*a* in the width direction (Y direction) due to rotation of the rolled paper 3 and slack of the wrapped long paper 3*a* of the rolled paper 3 in pulling out the long paper 3*a* from the rolled paper 3. Thus, the roll supporting device 5 achieves more reliable operation of pulling out the long paper 3*a* from the rolled paper 3. As a result, the long paper 3*a* can be stably supplied from the roll supporting device 5 to the printing device 6, and printing on the long paper 3*a* done by the printing device 6, is prevented from being out of position, resulting in improvement in print quality.

Moreover, in the roll supporting device 5, in either case where the rolled paper 3 used is of the so-called outside wrapping type or inside wrapping type, the restricting member 15A (15B), which is located upstream in the rotating direction of the rolled paper 3 among the pair of restricting members 15A and 15B, effectively reduces unsteadiness of the rolled paper 3, resulting in more reliable operation of pulling out the long paper 3*a* from the rolled paper 3. Furthermore, even when the strength of circumferential tension of the wrapped rolled paper 3 differs depending on the type of rolled paper 3, the pair of restricting members 15A and 15B reduce unsteadiness of the rolled paper 3, resulting in more reliable operation of pulling out the long paper 3*a* from the rolled paper 3.

Furthermore, the pair of restricting members 15A and 15B of the roll supporting device 5 of the embodiment include the restricting areas 15A1, 15A2, 15B1, and 15B2, which come into contact with the end surface 4*b* over the portion extending from the outer circumference in the radial direction of the rolled paper 3 to the inner circumference during the period, in which the long paper 3*a* is pulled out from the rolled paper 3 from the beginning until the end. Thus, irrespective of variation in the outer diameter of the rolled paper 3 and variation in the rotational speed of the rolled paper 3 with the varying outer diameter of the rolled paper 3, the restricting areas 15A1, 15A2, 15B1, and 15B2 come into contact with the entire area in the radial direction of the rolled paper 3 during the period of use of the rolled paper 3, which can maintain the restricted state of the rolled paper 3 in the width direction (Y direction).

The roll supporting device 5 of the embodiment further includes the compression springs 17, which apply a rotational load to the pair of supporting rollers 11A and 11B. This reduces rotation of the supporting rollers 11A and 11B when the rolled paper 3 rotates through inertia by pulling out the long paper 3*a* from the rolled paper 3, thereby reducing inertial rotation of the rolled paper 3. Thus, the wrapped long paper 3*a* of the rolled paper 3 can be prevented from loosening.

Furthermore, the pair of supporting rollers 11A and 11B of the roll supporting device 5 of the embodiment each include the tapered surface 19, which has an outer diameter decreasing from the end surface 4*b* side of the rolled paper 3 to the end surface 4*a* side. Thus, the tapered surfaces 19 move the rolled paper 3 toward the reference surface 12*a*, and the end surface 4*a* of the rolled paper 3 smoothly comes into contact with the reference surface 12*a*, which enhances stability of the restricted state of the rolled paper 3 in the width direction (Y direction).

Another embodiment will be described below with reference to the drawings. In the other embodiment, for the sake of convenience, the same constituents as those in the above-described embodiment are denoted by the same reference signs as those in the above-described embodiment, and their description is omitted. The other embodiment differs from the above-described embodiment in that the rotational load, which is applied to the pair of supporting rollers 11A and 11B, is varied with the varying outer diameter of the rolled paper 3.

Figure 8:
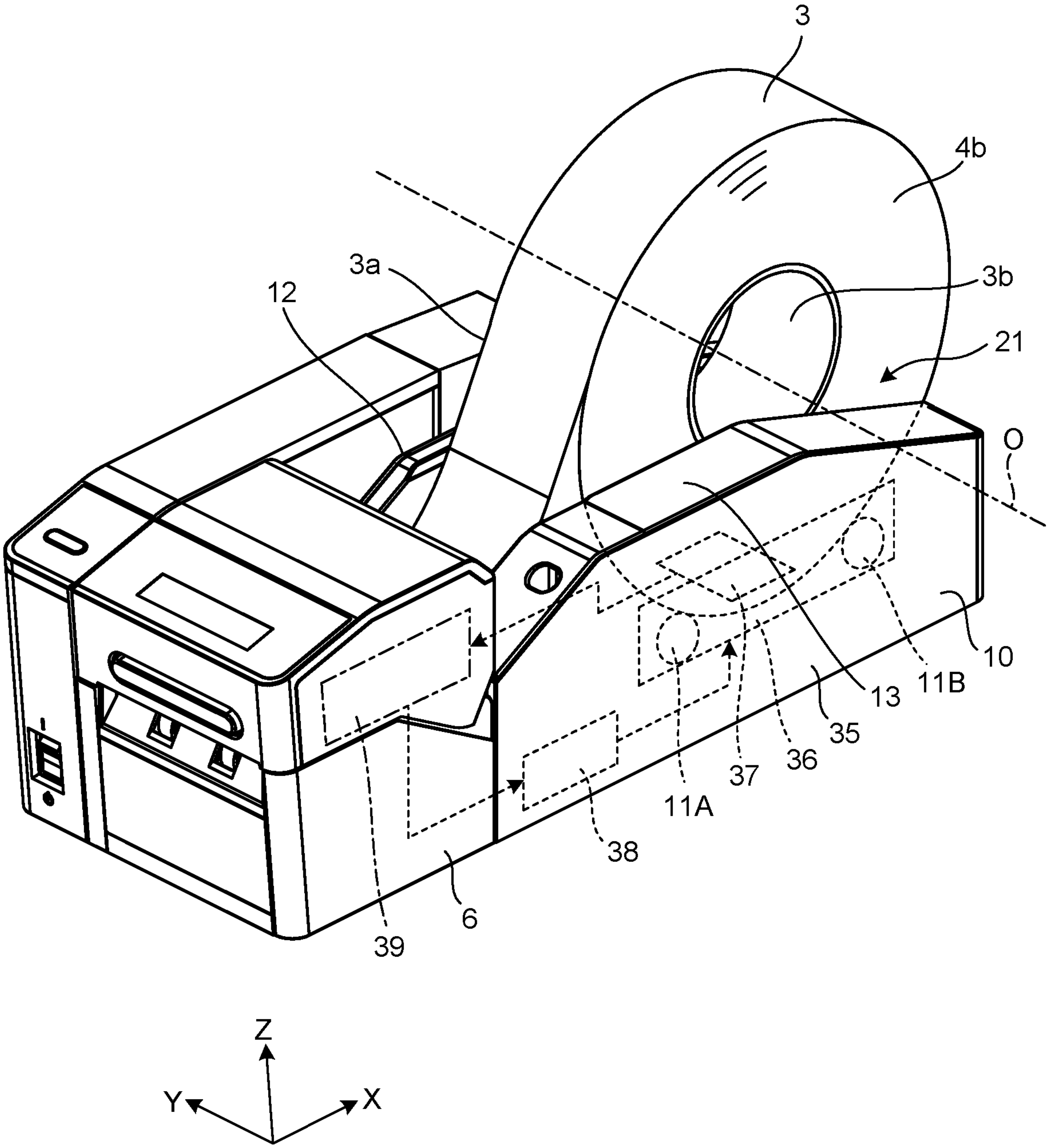
FIG. 8 is a perspective view for describing a roll supporting device according to another embodiment.
Figure 9:
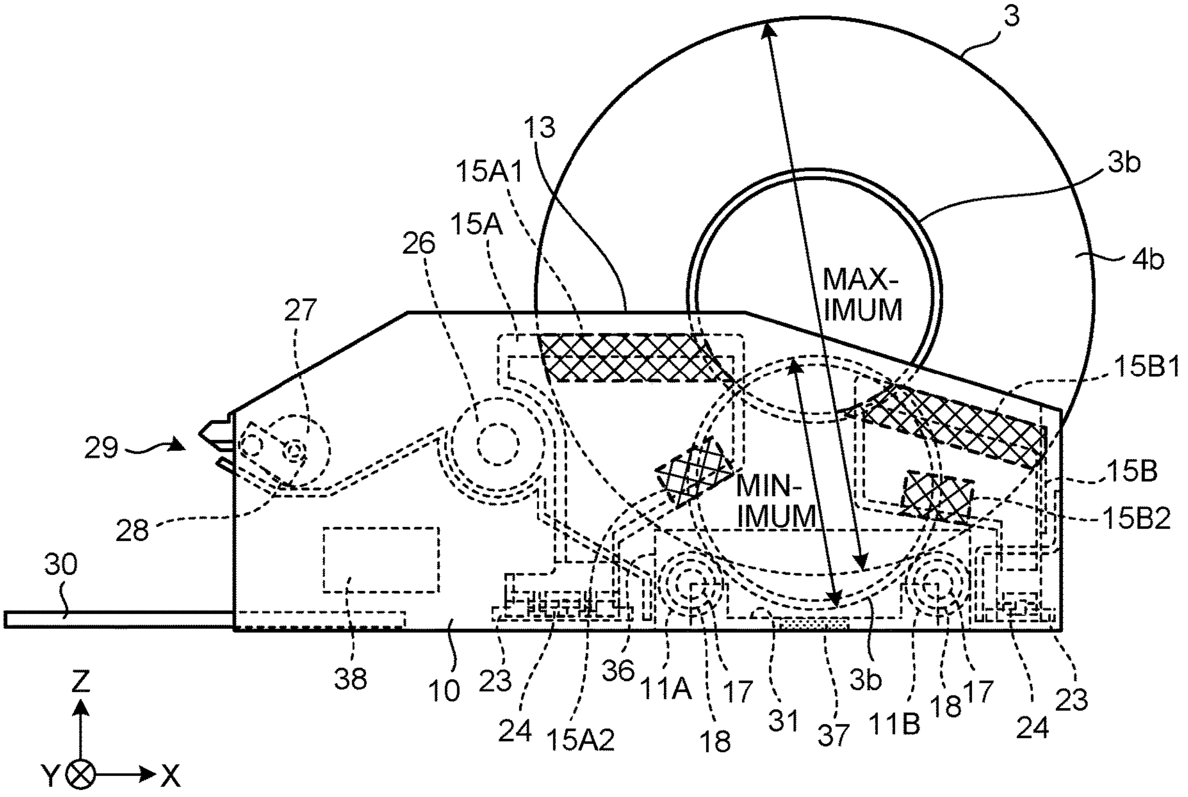
FIG. 9 is a side view for describing the roll supporting device according to the other embodiment.

FIG. 8 is a perspective view for describing a roll supporting device according to the other embodiment. FIG. 9 is a side view for describing the roll supporting device according to the other embodiment. As illustrated in FIG. 8 and FIG. 9, roll supporting device 35 of the other embodiment includes an electromagnetic brake 36, instead of the compression springs 17 that apply a rotational load to the pair of supporting rollers 11A and 11B. The roll supporting device 35 further includes a proximity sensor 37 serving as a detector detecting the size of the outer diameter of the rolled paper 3, and a brake control circuit 38 serving as a controller exercising such control that the electromagnetic brake 36 varies a rotational load applied by the electromagnetic brake 36 on the basis of a result of the detection at the proximity sensor 37.

Furthermore, a connection terminal (not illustrated) to be electrically connected to a connector (not illustrated) of the printing device 6, is provided on the connector 30 of the base 10, and the proximity sensor 37 and the brake control circuit 38 are connected to a control circuit 39 of the printing device 6 via the connection terminal. As the electromagnetic brake 36, a variable electromagnetic brake that can vary braking force serving as the rotational load in a stepwise or continuous manner, is used.

The proximity sensor 37 is disposed in the recessed portion 31 where the core 3*b* enters when the long paper 3*a* is pulled out from the rolled paper 3, and detects a distance to the outer circumferential surface (outer diameter) of the rolled paper 3, and sends a detection signal to the control circuit 39. The control circuit 39 calculates the outer diameter of the rolled paper 3 on the basis of the detection signal from the proximity sensor 37, and controls the brake control circuit 38 in accordance with the size of the outer diameter to vary the rotational load applied to the supporting rollers 11A and 11B by the electromagnetic brake 36. This enables a proper rotational load to be applied to the rolled paper 3 in accordance with variation in the outer diameter of the rolled paper 3. For example, when the rolled paper 3 placed has such a small outer diameter as to provide relatively stable behavior (or when the outer diameter of the rolled paper 3 is below a predetermined outer diameter), such control is exercised that the rotational load to the supporting rollers 11A and 11B is smaller, and when the rolled paper 3 placed has such a large outer diameter as to provide unstable behavior (or when the outer diameter of the rolled paper 3 is equal to or greater than the predetermined outer diameter), such control is exercised that the rotational load to the supporting rollers 11A and 11B is greater, thereby further enhancing stability of rotating operation of the rolled paper 3.

Note that roll supporting device 35 of the other embodiment is not limited to the configuration in which the proximity sensor 37 detects the amount of rotation of the first guide roller 26, and may have a configuration in which an encoder detects the amount of rotation of the second guide roller 27 or the amount of rotation of a guide roller (not illustrated) of the printing device 6.

The roll supporting device 15 may further include an optical sensor that detects variation in the outer diameter of the rolled paper 3, instead of the proximity sensor 37. In this case, a plurality of the optical sensors may be disposed at intervals in the radial direction of the rolled paper 3 that is placed in the placing space 21. Because the core 3*b* of the rolled paper 3 descends in accordance with variation in the outer diameter of the rolled paper 3, the electromagnetic brake 36 may be controlled, for example, by detecting variation in the position of the core 3*b* by the optical sensors.

Note that in the present embodiment, the electromagnetic brake 36 is controlled by the brake control circuit 38 of the roll supporting device 35; however, no such limitation is intended, and the electromagnetic brake 36 may be controlled directly by the control circuit 39 of the printing device 6. Furthermore, in the present embodiment, the control circuit 39 of the printing device 6 calculates the outer diameter of the rolled paper 3; however, the proximity sensor 37 may send the detection signal to the brake control circuit 38, and the brake control circuit 38 may calculate the outer diameter of the rolled paper 3 to control the electromagnetic brake 36. Furthermore, the brake control circuit 38 or the control circuit 39 may exercise such control that the pair of supporting rollers 11A and 11B have rotational loads applied thereto, in which magnitudes of the rotational loads differ depending on the direction of pulling out the long paper 3*a* from the rolled paper 3, that is, the rotating direction of the rolled paper 3.

As described above, in the roll supporting device 15 of the other embodiment, the brake control circuit 38 exercises such control that the electromagnetic brake 36 varies the rotational load applied to the supporting rollers 11A and 11B on the basis of the detection result from the proximity sensor 37. Thus, even with the outer diameter of the rolled paper 3 varying during the period of use of the rolled paper 3 or with the rotational speed of the rolled paper 3 varying with the varying outer diameter of the rolled paper 3, more stable rotating operation of the rolled paper 3 is achieved, and more reliable operation of pulling out the long paper 3*a* of the rolled paper 3 is achieved.

According to the one aspect of the roll supporting device disclosed in this application, operation of pulling out the medium from the rolled medium is achieved more reliably.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A roll supporting device comprising:

a pair of supporting rollers, which support an outer circumferential surface of a rolled medium that includes a wrapped long medium, and which are provided so as to rotate together with the rolled medium;

a side wall which includes a reference surface that comes into contact with one end surface of the rolled medium in an axial direction along a central axis of the rolled medium; and a pair of restricting members which press the one end surface of the rolled medium to the reference surface by contacting another end surface of the rolled medium in the axial direction, wherein the pair of supporting rollers are disposed on both sides of the central axis of the rolled medium when viewed in the axial direction of the rolled medium, and the pair of restricting members are disposed outside a space between the pair of supporting rollers in a circumferential direction of the rolled medium, and are respectively adjacent to the pair of supporting rollers, and are provided so as to be movable independently from each other.

2. The roll supporting device according to claim 1, wherein the pair of restricting members include restricting areas that come into contact with the other end surface over a portion extending from an outer circumference in a radial direction of the rolled medium to an inner circumference, during a period in which the wrapped long medium is pulled out from the rolled medium from a beginning of the wrapped long medium until an end.

3. The roll supporting device according to claim 1, further comprising a load applying member that applies a rotational load to the pair of supporting rollers.

4. The roll supporting device according to claim 1, wherein the pair of supporting rollers each include a tapered surface having an outer diameter that decreases from a side closer to the other end surface of the rolled medium to a side closer to the one end surface.

5. The roll supporting device according to claim 1, further comprising:

a brake that applies a rotational load to the pair of supporting rollers;

a controller that controls the brake; and a detector that detects variation in an outer diameter of the rolled medium, wherein the controller exercises such control that the brake varies the rotational load on a basis of a result of detection at the detector.

* * * * *